United States Patent
Frea et al.

(10) Patent No.: US 12,503,087 B2
(45) Date of Patent: Dec. 23, 2025

(54) METHOD FOR DETERMINING A CAPACITY VALUE OF A SUPER-CAPACITOR OF AN ELECTROMECHANICAL BRAKING SYSTEM OF AT LEAST ONE VEHICLE, ELECTROMECHANICAL BRAKING SYSTEM, AND VEHICLE

(71) Applicant: FAIVELEY TRANSPORT ITALIA S.P.A., Turin (IT)

(72) Inventors: Matteo Frea, Turin (IT); Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 202 days.

(21) Appl. No.: 18/565,500

(22) PCT Filed: Jun. 3, 2022

(86) PCT No.: PCT/IB2022/055179
§ 371 (c)(1),
(2) Date: Nov. 29, 2023

(87) PCT Pub. No.: WO2022/254385
PCT Pub. Date: Dec. 8, 2022

(65) Prior Publication Data
US 2024/0253603 A1 Aug. 1, 2024

(51) Int. Cl.
*B60T 8/171* (2006.01)
*B60T 13/74* (2006.01)
*G01R 27/26* (2006.01)

(52) U.S. Cl.
CPC .............. *B60T 8/171* (2013.01); *B60T 13/74* (2013.01); *G01R 27/2605* (2013.01)

(58) Field of Classification Search
CPC ........ G01R 27/00; G01R 27/02; G01R 27/26; G01R 27/2605; B60T 8/00; B60T 8/17;
(Continued)

(56) References Cited

U.S. PATENT DOCUMENTS

| | | | |
|---|---|---|---|
| 6,362,632 B1 * | 3/2002 | Livingston | G01F 23/266 73/304 C |
| 2021/0231714 A1 * | 7/2021 | Fourmont | H02H 3/247 |

FOREIGN PATENT DOCUMENTS

| | | | | |
|---|---|---|---|---|
| CN | 110435627 A | * | 11/2019 | G01B 7/082 |
| CN | 110957774 A | | 4/2020 | |

(Continued)

OTHER PUBLICATIONS

ISA European Patent Office, International Search Report Issued in Application No. PCT/IB2022/055179, Sep. 13, 2022, WIPO, 2 pages.

*Primary Examiner* — Hoai-An D. Nguyen
(74) *Attorney, Agent, or Firm* — K&L Gates LLP

(57) ABSTRACT

A method for determining a capacitance value of a super-capacitor of an electro-mechanical braking system is described. The method may include measuring a first voltage value at terminals of the super-capacitor; if the first voltage value is greater than a predetermined minimum voltage, performing a charge or discharge action of the super-capacitor for a measurement time period, in order to make the terminals of the super-capacitor assume a second voltage value greater than or equal to said minimum voltage; determining a voltage variation at the terminals of the super-capacitor during the measurement time period; determining a voltage variation rate; measuring a current value flowing in one of the terminals of the super-capacitor, at a measurement instant; and calculating the capacitance value of the super-capacitor. A braking system and a vehicle are also described.

13 Claims, 4 Drawing Sheets

(58) Field of Classification Search
CPC . B60T 8/171; B60T 8/32; B60T 8/321; B60T 8/3235; B60T 8/88; B60T 8/885; B60T 13/00; B60T 13/74; B60T 17/00; B60T 17/18; B60T 17/22; B60T 17/228; B60T 2270/00; B60T 2270/40; B60T 2270/406; B60T 2270/413; B60T 2270/414; B60Y 2306/00; B60Y 2400/00; B60Y 2306/13; B60Y 2400/81
USPC ..................................................... 324/76.11
See application file for complete search history.

(56) References Cited

FOREIGN PATENT DOCUMENTS

| | | | | | |
|---|---|---|---|---|---|
| CN | 111474412 | A | * | 7/2020 | ............... G01D 5/24 |
| CN | 111771269 | A | * | 10/2020 | ............. H01L 23/66 |
| CN | 113504422 | A | * | 10/2021 | ........... G01R 31/003 |
| EP | 1637422 | A1 | | 3/2006 | |
| WO | 2021047910 | A1 | | 3/2021 | |

* cited by examiner

METHOD FOR DETERMINING A CAPACITY VALUE OF A SUPER-CAPACITOR OF AN ELECTROMECHANICAL BRAKING SYSTEM OF AT LEAST ONE VEHICLE, ELECTROMECHANICAL BRAKING SYSTEM, AND VEHICLE

CROSS REFERENCE TO RELATED APPLICATIONS

The present application is a U.S. National Phase of International Application No. PCT/IB2022/055179 entitled "METHOD FOR DETERMINING A CAPACITY VALUE OF A SUPER-CAPACITOR OF AN ELECTROMECHANICAL BRAKING SYSTEM OF AT LEAST ONE VEHICLE, ELECTROMECHANICAL BRAKING SYSTEM, AND VEHICLE," and filed on Jun. 3, 2022. International Application No. PCT/IB2022/055179 claims priority to Italian Patent Application No. 102021000014618 filed on Jun. 4, 2021. The entire contents of each of the above-listed applications are hereby incorporated by reference for all purposes.

TECHNICAL FIELD

This invention generally lies within the field of methods and braking systems for vehicles; in particular, the invention relates to a method for determining a capacitance value of a super-capacitor of an electro-mechanical braking system of at least one vehicle, an electro-mechanical braking system, and a vehicle comprising this electro-mechanical braking system.

PRIOR ART

Nowadays, new electro-mechanical braking systems based on mechatronic technology, for example for railway applications, are being developed. Their design must functionally replicate that which was previously provided by a generic electro-pneumatic brake, for example for railway applications, especially with regard to safety-related functions.

In these new electro-mechanical braking systems, it is therefore necessary to ensure that:
 an amount of energy is stored which is capable of ensuring at least one emergency braking action;
 the emergency braking at the whole vehicle level reaches a predetermined minimum safety level.

For example, the braking systems are usually provided with an energy storage means which is arranged to store an amount of energy sufficient to cause the electro-pneumatic braking system to perform at least one complete emergency braking action.

Depending on the type of braking system, the energy storage means may take various forms.

For pneumatic braking systems, this energy storage means may traditionally be an auxiliary tank, for example. In this case, the energy is stored by means of storing compressed air in this auxiliary tank, and the volume of the auxiliary tank is taken as certain and invariable. In order to satisfy the necessary safety requirements, the internal pressure in the auxiliary tank is usually measured continuously, by means of one or more pressure sensors (in order to satisfy any redundancy requirements).

By monitoring the pressure inside the auxiliary tank, it is possible to immediately identify any loss in the stored energy that is required for performing emergency braking, and optionally promptly intervene in order to restore safety.

In electro-mechanical braking systems, however, the energy storage means may be, for example, a mechanical means for storing mechanical potential energy. The mechanical means may be a helical spring, for example. The mechanical means for storing mechanical potential energy may clearly perform the same function as that performed by the auxiliary tank described above, which is that of storing the energy required to apply at least one emergency braking action.

Again, in order to satisfy the necessary safety requirements, it is also possible, by means of suitable sensors, to monitor the mechanical energy stored in the mechanical means for storing mechanical potential energy.

Again, by monitoring the energy stored in the mechanical means for storing mechanical potential energy, it is possible to immediately identify any loss in the stored energy that is required for performing emergency braking, and optionally promptly intervene in order to restore safety.

Other forms of mechanical energy storage may clearly also be used, such as, by way of non-exclusive example, a flat spiral spring, in cases where the transfer of forces is rotational rather than translational.

In a further example, the stored energy may be kinetic energy and may be stored in a flywheel which is kept in adequate rotation by an electric motor. Again, in order to satisfy safety requirements, it is possible to monitor the stored kinetic energy by means of suitable sensors. By monitoring the kinetic energy stored in the mechanical means for storing kinetic energy, it is possible to immediately identify any loss in the stored kinetic energy that is required for performing emergency braking, and optionally promptly intervene in order to restore safety.

In yet a further example, the energy storage means of an electro-mechanical braking system may be an electrical energy storage means, for example a super-capacitor. In this case, an energy charger may transfer energy from a supply source to said super-capacitor. According to that which has been described above, the super-capacitor performs the same function as that performed by the auxiliary tank, which is that of storing the electrical energy required to apply at least one emergency braking action.

The energy stored in a super-capacitor is:

$$\text{energy} = 1/2 * C * V^2,$$

where C is the capacitance and V is the voltage.

Therefore, in order to be able to monitor the actual presence of sufficient energy to brake, it is necessary to monitor the voltage across the capacitor and the capacitance thereof.

However, with regard to the capacitance, a super-capacitor usually has a nominal capacitance value that is indicative of the amount of electrical energy that may be stored therein.

Disadvantageously, a super-capacitor is subject to wear and, over the course of its use, experiences a gradual reduction in its capacitance. This wear may even reach levels which would no longer allow said super-capacitor to store an amount of electrical energy sufficient to cause complete emergency braking to be performed.

In order to measure the capacitance of the super-capacitor, the prior art discloses systems and methods which require the availability of energy stored in the super-capacitor to be changed, which temporarily compromises the ability to perform emergency safety braking.

SUMMARY OF THE INVENTION

The object of this invention is therefore that of providing a solution that makes it possible to monitor the residual capacitance of a super-capacitor of an electro-mechanical braking system of at least one vehicle without temporarily compromising the ability to perform emergency safety braking, so as to further increase the safety level of the electro-mechanical braking system.

The aforesaid and other objects and advantages are achieved, according to one aspect of the invention, by a method for determining a capacitance value of a super-capacitor of an electro-mechanical braking system of at least one vehicle, which method has the features defined in claim 1.

The aforesaid and other objects and advantages are achieved, according to a further aspect of the invention, by an electro-mechanical braking system for at least one vehicle, which system has the features defined in claim 6.

The aforesaid and other objects and advantages are achieved, according to yet a further aspect of the invention, by a vehicle which has the features defined in claim 12.

Preferred embodiments of the invention are defined in the dependent claims, the content of which is to be understood as an integral part of the present description.

BRIEF DESCRIPTION OF THE DRAWINGS

The functional and structural features of some preferred embodiments of a method for determining a capacitance value of a super-capacitor of an electro-mechanical braking system of at least one vehicle, an electro-mechanical braking system, and a vehicle according to the invention will now be described. Reference is made to the accompanying drawings, in which.

DETAILED DESCRIPTION

Figure 1:
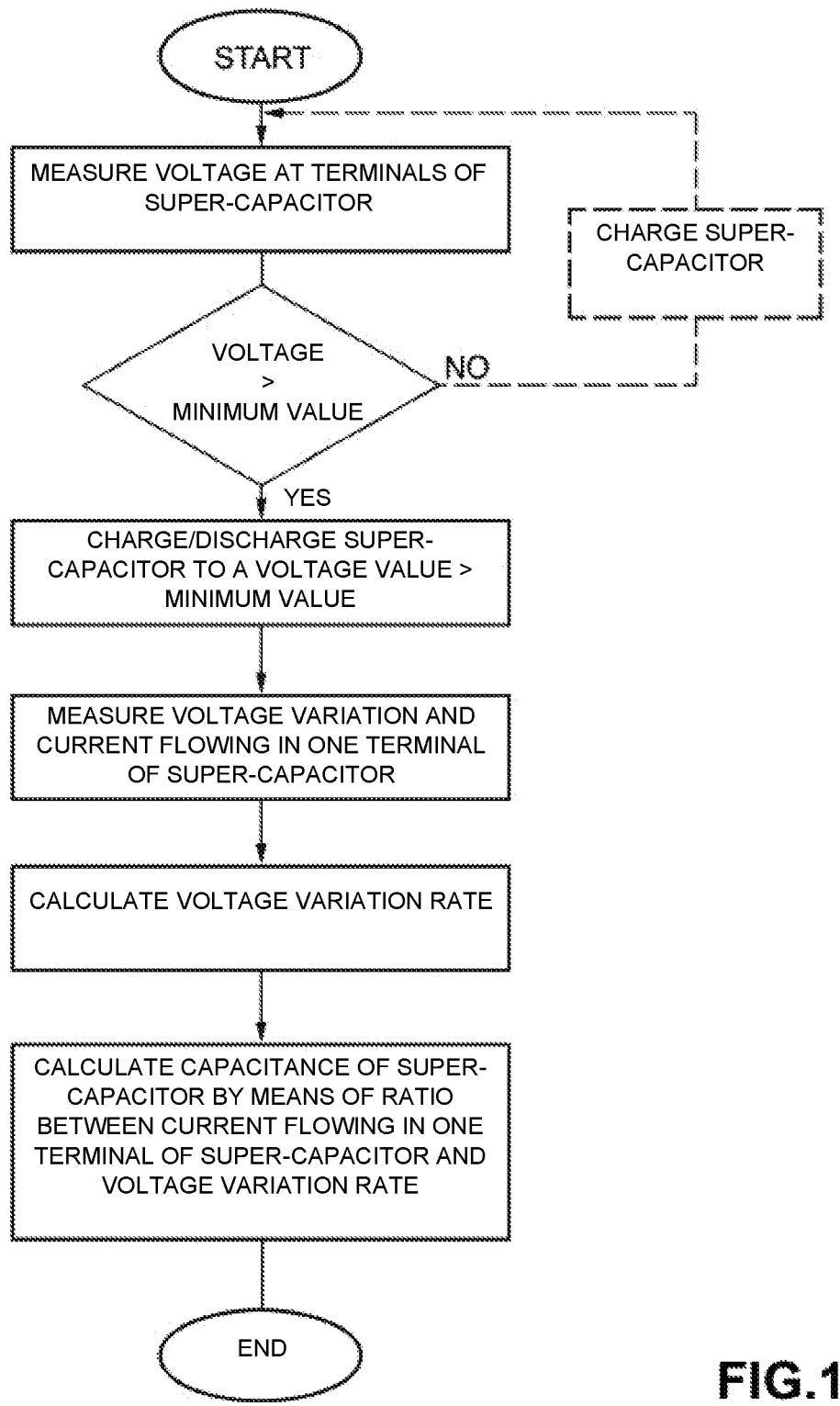
FIG. 1 is a first flow chart showing an embodiment of a method for determining a residual capacitance value of an emergency super-capacitor of an electro-mechanical braking system of at least one railway vehicle according to the invention.

Before explaining in detail a plurality of embodiments of the invention, it should be clarified that the invention is not limited in its application to the design details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and the variations thereof are intended to cover the elements set out below and their equivalents, as well as additional elements and the equivalents thereof.

With reference, by way of example, to FIG. 1, the following describes a first embodiment of a method for determining a capacitance value of a super-capacitor 100 of an electro-mechanical braking system 102 of at least one vehicle.

This super-capacitor 100 may be arranged to store an amount of electrical energy sufficient to cause the braking system 102 to perform at least one emergency braking action.

The method may comprise the following steps:
a) measuring a first voltage value at terminals of said super-capacitor;
b) if said first voltage value is greater than a predetermined minimum voltage value, performing a charge or discharge action of said super-capacitor for a measurement time period, wherein said charge or discharge action is arranged to make said terminals of said super-capacitor assume a second voltage value greater than or equal to said minimum voltage value;
c) determining a voltage variation at the terminals of said super-capacitor 100 during said measurement time period;
d) determining a voltage variation rate on the basis of the voltage variation at the terminals of said super-capacitor determined in step c) and a duration of time of said measurement time period; e) measuring a current value flowing in one of said terminals of said super-capacitor, at a measurement instant of said measurement time period;
f) calculating the capacitance value of said super-capacitor by means of the ratio between said current value measured at said measurement instant and said voltage variation rate.

In other words, it is possible to monitor the voltage across the super-capacitor, in order to verify that this voltage is greater than a predetermined minimum voltage value. This minimum voltage value may be determined as a value which indicates the fact that the energy stored in the super-capacitor is sufficient for performing emergency braking if required. Once it has been verified that the super-capacitor 100 is sufficiently charged to be able to perform the emergency braking action, it is possible to charge or discharge the super-capacitor for a measurement time period. This charge or discharge action is arranged to be able to make the terminals of said super-capacitor assume a second voltage value. However, at said terminals of said super-capacitor, the second voltage value has to be greater than or equal to said minimum voltage value in order to guarantee that, even during and after the charge or discharge action, the super-capacitor has stored sufficient energy to perform emergency braking if required. During said measurement time period in which the charge or discharge action takes place, it is possible to determine, for example by means of measuring, the voltage variation at the terminals of the super-capacitor 100. For example, if, at the beginning, the voltage across the super-capacitor is 50V and, at the end of the discharge action, the voltage across the super-capacitor is 40V, the voltage variation at the terminals of the super-capacitor is 10V. However, if, at the beginning, the voltage across the super-capacitor is 50V and, at the end of the charge action, the voltage across the super-capacitor is 55V, for example, the voltage variation at the terminals of the super-capacitor is 5V.

Once the voltage variation at the terminals of the super-capacitor has been determined, it is possible to determine a voltage variation rate, also known as a voltage variation speed, on the basis of the voltage variation at the terminals of the super-capacitor and the duration of time of the measurement time period. It is also possible to measure a current value flowing in one of the terminals of the super-capacitor, at a measurement instant of the measurement time period. The measured current value flowing in one of the terminals of the super-capacitor, during a charge action experienced by the super-capacitor, may be an absorption current entering the terminal of the super-capacitor, or, during a discharge action experienced by the super-capacitor, may be a current emitted out of the terminal of the super-capacitor.

For example, the measurement instant may be the instant immediately after the start instant of the measurement time period, or the instant immediately preceding the end instant of the measurement time period, or any instant between the instant immediately after the start instant of the measurement time period and the instant immediately preceding the end instant of the measurement time period. The current value flowing in one of the terminals of the super-capacitor may also be measured at a plurality of measurement instants of the measurement time period.

Lastly, it is possible to calculate the capacitance value of the super-capacitor by means of the ratio between said current value measured at said measurement instant and said voltage variation rate. For example, it is possible to apply the following equation:

$$i = c*dv/dt \rightarrow c = i/(dv/dt)$$

where i is the current value flowing in one of the terminals of the super-capacitor, at a measurement instant of the measurement time period, c is the capacitance of the super-capacitor, and dv/dt is the voltage variation rate (i.e. the derivative over time of the voltage across the super-capacitor).

For example, with reference to the field of railway vehicles, emergency braking is braking which results in at least one railway vehicle stopping or decelerating to walking pace. Emergency braking may be automatically activated, for example, if a situation of potential danger is detected by at least one system of the railway vehicle. The prior art will be analyzed with particular reference to the field of railway vehicles.

Within the railway sector, reference may be made to the following European standards:
EN50126 ["Railway applications. The specification and demonstration of reliability, availability, maintainability and safety (RAMS).
EN50128 ["Railway applications. Communications, signalling and processing systems. Software for railway control and protection systems" ]
EN50129 ["Railway applications. Communication, signaling and processing systems. Safety related electronic systems for signalling" ].
EN50159 ["Railway applications. Communication, signaling and processing systems. Safety-related communication in transmission systems" ].

In particular, standard EN50126 defines the methodologies for assigning safety levels SIL0/1/2/3/4 (with safety level SIL4 indicating the maximum safety level) to the subsystems making up the system in question, based on the results of the safety analysis, and standards EN50128 and EN50129 define the design criteria to be applied to the software and hardware components respectively on the basis of the SIL levels assigned based on said safety analysis results. The systems involved in braking are usually required to have a safety level SIL=4.

With reference instead to the field of road vehicles, emergency braking may be braking, in accordance with the required NCAPs relating to emergency braking, which allows the road vehicle to be stopped or decelerated in order to protect pedestrians or prevent impending accidents with vehicles.

Step a), i.e. measuring a first voltage value at the terminals of said super-capacitor, may preferably be carried out when the super-capacitor is not undergoing a charge action. In so doing, the measurement would not be influenced by any charging voltage applied to the terminals of the super-capacitor in order to charge it.

Step d), i.e. determining a voltage variation rate on the basis of the voltage variation at the terminals of said super-capacitor determined in step c) and a duration of time of said measurement time period, may preferably comprise:
determining the voltage variation rate by means of the ratio between the voltage variation determined in step c) and said duration of time of said measurement time period.

For example, if the voltage variation at the terminals of the super-capacitor is 10V and the measurement time period lasts 2s, the voltage variation rate is 5V/s.

The method for determining a capacitance value of a super-capacitor may preferably also comprise the step of:
comparing the calculated capacitance value of said super-capacitor with a predetermined minimum capacitance threshold.

For example, the minimum capacitance threshold may be determined on the basis of a maximum allowed wear value, beyond which the super-capacitor is no longer able to store sufficient energy to perform emergency braking.

When the comparison shows that the calculated capacitance value of said super-capacitor is less than said predetermined minimum capacitance threshold, the method may preferably also comprise the step of:
sending a maintenance request or alarm signal to a remote control station; and/or
operating a signaling means arranged in a control cabin of the vehicle; and/or
transmitting an error message to a control unit of the vehicle; and/or
preventing the release of the braking force generated by the electro-mechanical braking system.

In the railway sector, for example, a control means, e.g. a train control unit (BCU), may communicate with the control unit of the vehicle, i.e. a central train control unit (TCMS). The communication may occur via various means of communication, for example hardware or bus networks (ethernet, CAN, MVB, etc.).

In other words, if excessive consumption of the super-capacitor is detected, it is possible to intervene, for example by sending a maintenance request or alarm signal to the remote control station, and/or by operating a signaling means arranged in a control cabin of the vehicle, and/or by transmitting an error message to the control unit of the vehicle, and/or by preventing the release of the braking force generated by the electro-mechanical braking system.

For example, the signaling means may be visual or audible, e.g. an indicator light, an LED, a display, a loudspeaker, or the like.

In a further aspect, this invention relates to an electro-mechanical braking system for at least one vehicle.

Figure 2:
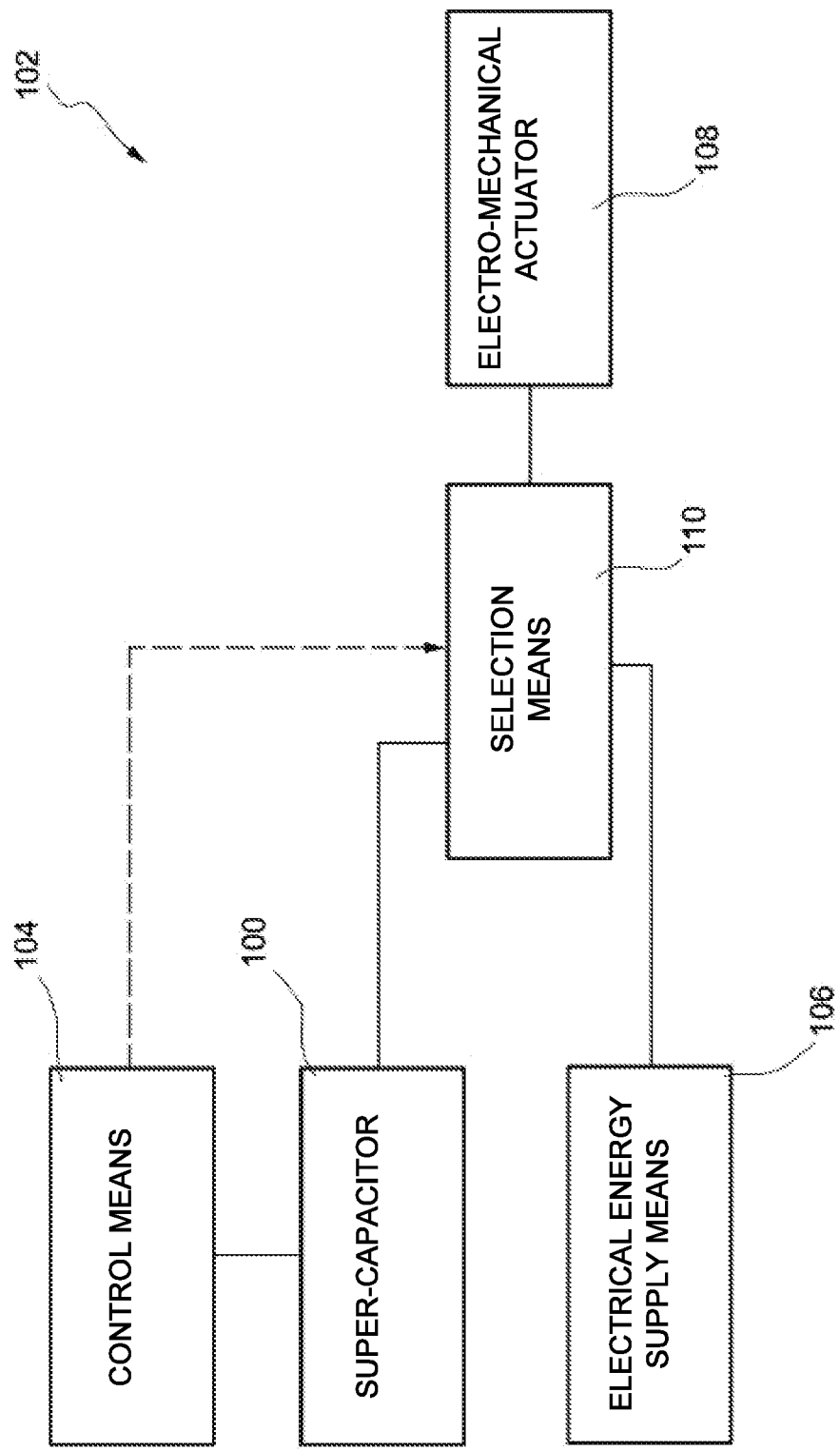
FIG. 2 shows a first embodiment of an electro-mechanical braking system comprising a super-capacitor.

With reference, by way of example, to FIG. 2, the following describes an embodiment of an electro-mechanical braking system.

In a first embodiment, the electro-mechanical braking system may comprise:
- a super-capacitor arranged to store an amount of electrical energy sufficient to cause the braking system to perform at least one emergency braking action;
- a control means 104 arranged to carry out a method for determining a capacitance value of a super-capacitor according to any one of the embodiments described above.
- For example, the control means 104 may be a controller, a microcontroller, an electronic control unit, a control unit, a control module, a PLC, or the like.

For example, the control means may directly include timing means (e.g. timers) and/or means for measuring current (e.g. current sensors) and/or means for measuring voltage (e.g. voltage sensors), or may receive data from timing means and/or means for measuring current and/or means for measuring voltage that are external to said control means and coupled to the respective elements of the electro-mechanical braking system, in order to have available the various voltage, current and time data for carrying out the method for determining a capacitance value of a super-capacitor, e.g. the first voltage value at terminals of said super-capacitor, the second voltage value, the voltage variation, the duration of time of said measurement time period, the current value flowing in one of said terminals of said super-capacitor, etc.

The electro-mechanical braking system may preferably be arranged to receive at least part of a second amount of energy from an electrical energy supply means 106 of said vehicle. For example, the electrical energy supply means 106 may be the battery of the vehicle.

The electro-mechanical braking system may preferably also comprise:
- an electro-mechanical actuator 108 arranged to receive electrical energy and convert it into a braking force;
- at least one selection means 110 arranged to receive at least part of the amount of electrical energy stored in said super-capacitor and at least part of the second amount of electrical energy stored in the supply means, and selectively supply at least part of the amount of electrical energy stored in said super-capacitor or at least part of the second amount of electrical energy stored in the electrical energy supply means 106 to said electro-mechanical actuator 108.

In other words, for example, the selection means 110 may receive at least part of the amount of electrical energy stored in said super-capacitor and at least part of the second amount of electrical energy stored in the battery of the vehicle, in order to selectively deliver said energy to the electro-mechanical actuator.

When the braking system receives a request to perform braking, the at least one selection means is preferably arranged to be able to selectively:
- supply to said electro-mechanical actuator at least part of the amount of electrical energy stored in said super-capacitor if the voltage at the terminals of said supply means is lower than said minimum voltage value; or
- supply to said electro-mechanical actuator at least part of the second amount of electrical energy stored in said electrical energy supply means 106 if the voltage at the terminals of said supply means is greater than said minimum voltage value.

In other words, when the braking system receives a request to perform braking, the at least one selection means is preferably arranged to provide the electro-mechanical actuator with at least part of the amount of electrical energy stored in the super-capacitor if the voltage at the terminals of said supply means (e.g. the battery of the vehicle), which voltage is indicative of the energy stored in the battery, is less than said minimum voltage value, i.e. is not able to perform emergency braking. Alternatively, when the braking system receives a request to perform braking, the at least one selection means is arranged to provide the electro-mechanical actuator with at least part of the second amount of electrical energy stored in said electrical energy supply means 106 (e.g. the battery of the vehicle) if the voltage at the terminals of said supply means 106 is greater than said minimum voltage value, i.e. is able to perform emergency braking.

The control means may preferably be arranged to receive a signal indicative of the voltage value at the terminals of said electrical energy supply means 106 (e.g. the battery of the vehicle). When the signal indicative of the voltage value at the terminals of said electrical energy supply means 106 indicates a voltage value at the terminals of said electrical energy supply means 106 that is less than said minimum voltage value, the control means may also be arranged to:
- via the selection means, provide said electro-mechanical actuator with at least part of the amount of electrical energy stored in said super-capacitor in order to apply automatic emergency braking.

In other words, when the control means detects that the battery of the vehicle has failed, or when the battery of the vehicle is too used or damaged, said control means may actuate the selection means to provide the electro-mechanical actuator with at least part of the amount of electrical energy stored in said super-capacitor in order to perform automatic braking.

Figure 3:
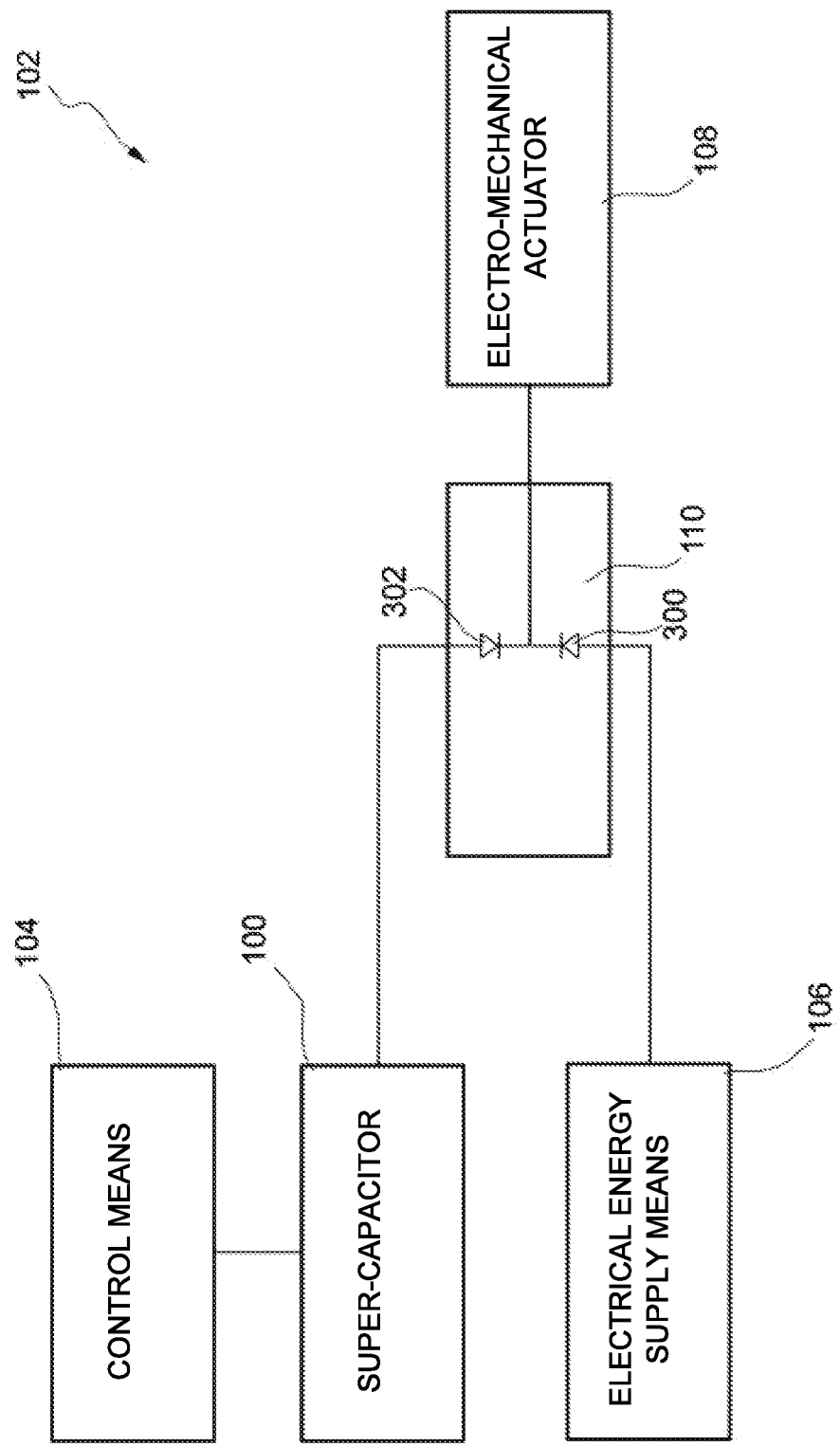
FIG. 3 shows a second embodiment of an electro-mechanical braking system comprising a super-capacitor.

With reference to FIG. 3, the selection means may preferably include at least:
- a first diode 300 connected between said electrical energy supply means 106 and said electro-mechanical actuator, and a second diode 302 connected between said super-capacitor and said electro-mechanical actuator.

Figure 4:
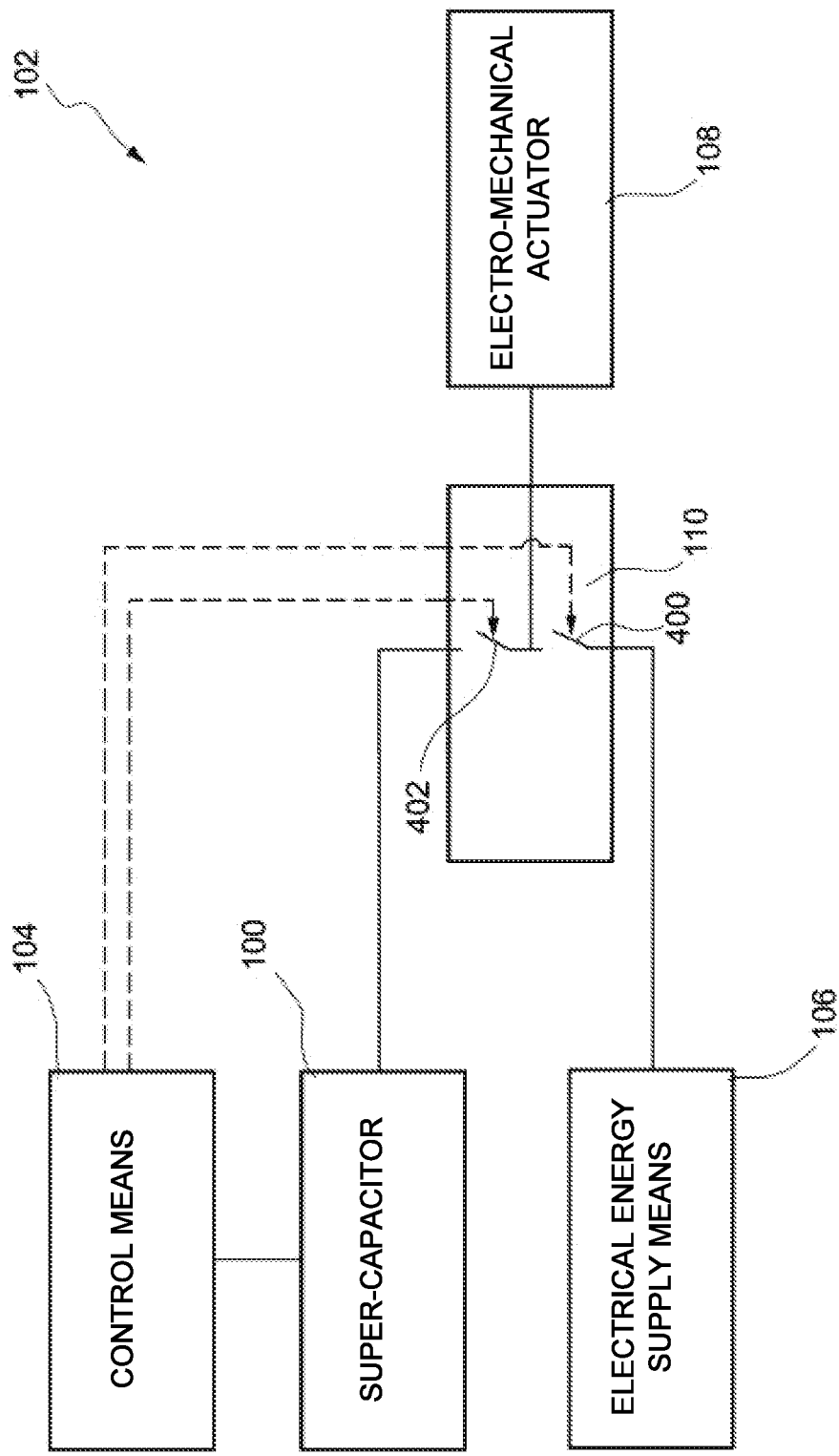
FIG. 4 shows a second embodiment of an electro-mechanical braking system comprising a super-capacitor.

Alternatively, with reference to FIG. 4, the selection means may include at least:
- a first switching means 400 connected between said electrical energy supply means 106 and said electro-mechanical actuator, and a second switching means 402 connected between said super-capacitor and said electro-mechanical actuator.

For example, each switching means may be a switch which is arranged such that it may be switched by said control means.

The electro-mechanical braking system may preferably comprise:
- a communication means arranged to send a maintenance request or alarm signal to a remote control station or an error message to the vehicle control unit TCMS; and/or
- a signaling means arranged in a control cabin of the vehicle;
- a means for preventing the release of the braking force generated by the electro-mechanical braking system.

Below are some embodiments of electro-mechanical braking systems.

The following describes a possible embodiment of an electro-mechanical braking system comprising an emergency super-capacitor. For example, the electro-mechanical braking system is arranged to be installed on at least one railway vehicle. This electro-mechanical braking system comprises at least one emergency super-capacitor arranged to store electrical energy. In this case, the electrical energy stored in the emergency super-capacitor, when provided to an electro-mechanical assembly of the braking system, may be sufficient for activating the electro-mechanical assembly to generate a braking force suitable for causing the braking system to perform at least one emergency braking action.

For example, the electro-mechanical assembly may include an electric motor, by means of operating which it is possible to regulate the braking force generated by the electro-mechanical assembly. The braking system may also include a control means and a first connection means.

The control means may be arranged to selectively connect or disconnect the at least one emergency super-capacitor to/from the electric motor, via said first connection means, so as to selectively provide the electrical energy stored in the at least one emergency super-capacitor to the electric motor.

The electric motor may be arranged to activate when it receives said electrical energy from the at least one emergency super-capacitor, so as to make the electro-mechanical assembly generate the braking force suitable for causing the braking system to perform the at least one emergency braking action.

For example, when the at least one emergency super-capacitor has to store electrical energy, the control means may be arranged to connect the at least one emergency super-capacitor to a battery of the at least one railway vehicle. As an alternative or in addition, the control means may be arranged to connect the at least one emergency super-capacitor to an electrical energy recovery system that is comprised in or associated with the braking system. The electrical energy recovery system may be arranged to recover electrical energy while the electro-mechanical assembly is applying a braking force.

For example, the electro-mechanical assembly may include:
a transmission shaft rotatably connected to the electric motor;
a linear actuator capable of extending from a retracted position in which two ends of the linear actuator are at a first distance dis1, to an extended position in which said ends of the linear actuator are at a second distance dis2 that is greater than the first distance dis1;
a transmission mechanism arranged between the transmission shaft and the linear actuator, wherein the transmission mechanism may be arranged to convert the rotary motion of the transmission shaft into a linear motion of the linear actuator.

For example, the electric motor may be arranged to:
cause the transmission shaft to rotate in a first direction d1, the rotation of the transmission shaft in the first direction d1 causing the distance between the two ends of the linear actuator to increase;
cause the transmission shaft to rotate in a second direction d2 opposite to said first direction d1, the rotation of the transmission shaft in the second direction d2 causing the distance between the two ends of the linear actuator to decrease.

In one example, the braking force generated by the braking system may increase when the linear actuator moves from the first retracted position toward the extended position, or the braking force generated by the braking system may decrease when the linear actuator moves from the first retracted position toward the extended position.

In a further aspect, the following invention relates to a vehicle. This vehicle may comprise:
an electrical energy supply means 106;
an electro-mechanical braking system 102 for at least one vehicle according to any one of the embodiments described above.

The vehicle preferably comprises at least one railway vehicle.

The vehicle is preferably a railway train.

This invention may preferably be applicable to any type of vehicle. This may include, for example, railway vehicles/trains, a car, a truck (for example a highway semi-trailer truck, a mining truck, a truck for transporting timber or the like) or the like, and the route may be a track, a road or a trail.

The resulting advantage is therefore that of having provided a solution that makes it possible to monitor the residual capacitance of a super-capacitor of an electro-mechanical braking system of at least one vehicle without temporarily compromising the ability to perform emergency safety braking, so as to further increase the level of safety of the electro-mechanical braking system.

Various aspects and embodiments of a super-capacitor of an electro-mechanical braking system of at least one vehicle, an electro-mechanical braking system, and a vehicle comprising this electro-mechanical braking system according to the invention have been described. It is understood that each embodiment may be combined with any other embodiment. Moreover, the invention is not limited to the embodiments described, but may be varied within the scope defined by the appended claims.

The invention claimed is:

1. A method for determining a capacitance value of a super-capacitor of an electro-mechanical braking system of at least one vehicle, wherein said super-capacitor is arranged to store an amount of electrical energy sufficient to cause the electro-mechanical braking system to perform at least one emergency braking action;
wherein said method includes the steps of:
a) measuring a first voltage value at terminals of said super-capacitor;
b) if said first voltage value is greater than a predetermined minimum voltage value, performing a charge or discharge action of said super-capacitor for a measurement time period, wherein said charge or discharge action is arranged to make said terminals of said super-capacitor assume a second voltage value greater than or equal to said minimum voltage value;
c) determining a voltage variation at the terminals of said super-capacitor during said measurement time period;
d) determining a voltage variation rate on the basis of the voltage variation at the terminals of said super-capacitor determined in step c) and a duration of time of said measurement time period;
e) measuring a current value flowing in one of said terminals of said super-capacitor, at a measurement instant of said measurement time period;
f) calculating the capacitance value of said super-capacitor by means of the ratio between said current value measured at said measurement instant and said voltage variation rate.

2. The method for determining a capacitance value of a super-capacitor according to claim 1, wherein step a) is performed when the super-capacitor is not undergoing a charge action.

3. The method for determining a capacitance value of a super-capacitor according to claim 1, wherein step d) comprises:
determining the voltage variation rate by means of the ratio between the voltage variation determined in step c) and said duration of time of the measurement time period.

4. The method for determining a capacitance value of a super-capacitor according to claim 1, further comprising the step of:
   comparing the calculated capacitance value of said super-capacitor with a predetermined minimum capacitance threshold.

5. The method for determining a capacitance value of a super-capacitor according to claim 4, wherein, when the comparison shows that the calculated capacitance value of said super-capacitor is less than said predetermined minimum capacitance threshold, the method further comprises the step of:
   sending a maintenance request or alarm signal to a remote control station; and/or
   operating a signaling means arranged in a control cabin of the vehicle; and/or
   transmitting an error message to a control unit of the vehicle; and/or
   preventing the release of the braking force generated by the electro-mechanical braking system.

6. An electro-mechanical braking system for at least one vehicle, comprising:
   a super-capacitor arranged to store an amount of electrical energy sufficient to cause the electro-mechanical braking system to perform at least one emergency braking action;
   a control means arranged to carry out a method for determining a capacitance value of a super-capacitor according to claim 1.

7. The electro-mechanical braking system for at least one vehicle according to claim 6, wherein said electro-mechanical braking system is arranged to receive at least part of a second amount of electrical energy from an electrical energy supply means of said vehicle;
   said electro-mechanical braking system further comprising:
   an electro-mechanical actuator arranged to receive electrical energy and convert it into a braking force;
   at least one selection means arranged to receive at least part of the amount of electrical energy stored in said super-capacitor and at least part of the second amount of electrical energy stored in the electrical energy supply means, and selectively supply at least part of the amount of electrical energy stored in said super-capacitor or at least part of the second amount of electrical energy stored in the electrical energy supply means to said electro-mechanical actuator.

8. The electro-mechanical braking system for at least one vehicle according to claim 7, wherein, when said electro-mechanical braking system receives a request to perform braking, said at least one selection means is arranged to selectively:
   supply to said electro-mechanical actuator at least part of the amount of electrical energy stored in said super-capacitor if the voltage at the terminals of said electrical energy supply means is lower than said minimum voltage value; or
   supply to said electro-mechanical actuator at least part of the second amount of electrical energy stored in said electrical energy supply means if the voltage at the terminals of said electrical energy supply means is greater than said minimum voltage value.

9. The electro-mechanical braking system for at least one vehicle according to claim 7, wherein said control means is arranged to receive a signal indicative of the voltage value at the terminals of said electrical energy supply means; wherein, when said signal indicative of the voltage value at the terminals of said electrical energy supply means indicates a voltage value at the terminals of said electrical energy supply means that is less than said minimum voltage value, said control means is further arranged to:
   via the selection means, provide said electro-mechanical actuator with at least part of the amount of electrical energy stored in said super-capacitor in order to apply automatic emergency braking.

10. The electro-mechanical braking system for at least one vehicle according to claim 6, wherein said selection means includes at least:
    a first diode connected between said electrical energy supply means and said electro-mechanical actuator, and a second diode connected between said super-capacitor and said electro-mechanical actuator; or
    a first switching means connected between said electrical energy supply means and said electro-mechanical actuator, and a second switching means connected between said super-capacitor and said electro-mechanical actuator.

11. The electro-mechanical braking system for at least one vehicle, when said control means is arranged to carry out a method for determining a capacitance value of a super-capacitor according to claim 5, comprising:
    a communication means arranged to send a maintenance request or alarm signal to a remote control station or an error message to the control unit of the vehicle; and/or
    a signaling means arranged in a control cabin of the vehicle;
    a means for preventing the release of the braking force generated by the electro-mechanical braking system.

12. A vehicle comprising:
    an electrical energy supply means;
    an electro-mechanical braking system for at least one vehicle according to claim 6.

13. The vehicle according to claim 12, wherein said vehicle comprises at least one railway vehicle.

* * * * *